US008607046B1

(12) United States Patent
Silberman et al.

(10) Patent No.: US 8,607,046 B1
(45) Date of Patent: Dec. 10, 2013

(54) SYSTEM AND METHOD FOR SIGNING A MESSAGE TO PROVIDE ONE-TIME APPROVAL TO A PLURALITY OF PARTIES

(75) Inventors: Joshua Silberman, Sunnyvale, CA (US); Ananthan Subramanian, Sunnyvale, CA (US); Fumiaki Okushi, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 1369 days.

(21) Appl. No.: 11/738,831

(22) Filed: Apr. 23, 2007

(51) Int. Cl.
*H04L 9/32* (2006.01)
(52) U.S. Cl.
USPC ............... 713/168; 713/180; 713/182; 726/9; 726/20
(58) Field of Classification Search
USPC ................. 713/170, 171, 176, 168, 179–182; 726/4, 9, 21, 1, 20
See application file for complete search history.

(56) References Cited

U.S. PATENT DOCUMENTS

| | | | |
|---|---|---|---|
| 1,310,719 | A | 7/1919 | Vernam |
| 4,262,329 | A | 4/1981 | Bright et al. |
| 4,558,176 | A | 12/1985 | Arnold et al. |
| 4,588,991 | A | 5/1986 | Atalla |
| 4,757,533 | A | 7/1988 | Allen et al. |
| 5,065,429 | A | 11/1991 | Lang |
| 5,150,407 | A | 9/1992 | Chan |
| 5,185,717 | A | 2/1993 | Mori |
| 5,235,641 | A | 8/1993 | Nozawa |
| 5,235,642 | A | 8/1993 | Wobber et al. |
| 5,265,159 | A | 11/1993 | Kung |
| 5,677,952 | A | 10/1997 | Blakley, III et al. |
| 5,687,237 | A | 11/1997 | Naclerio |
| 5,720,034 | A | 2/1998 | Case |
| 5,825,880 | A * | 10/1998 | Sudia et al. ................. 713/180 |

(Continued)

FOREIGN PATENT DOCUMENTS

| | | |
|---|---|---|
| WO | WO 02/093314 A2 | 11/2002 |
| WO | WO 02/093314 A3 | 11/2002 |

OTHER PUBLICATIONS

Anderson et al., "The Steganographic File System," Information Hiding, Second International Workshop, IH '98 Portland, Oregon. USA, Apr. 14-17, 1998, Proceedings, pp. 73-82, 1998.
Antonelli, et al., "The Packet Vault: Secure Storage of Network Data," CITI Technical Report 98-5, pp. 1-15, Jun. 25, 1998.
Blaze, "Oblivious Key Escrow," Information Hiding, First International Workshop, Cambridge, UK, May 3D-Jun. 1, 1996, Proceedings, pp. 335-343, 1996.

(Continued)

*Primary Examiner* — Ashok Patel
*Assistant Examiner* — Daniel Potratz
(74) *Attorney, Agent, or Firm* — Cesari and McKenna, LLP

(57) ABSTRACT

A system and method for batch signing of a message is provided. An administrator initiates a management operation directed to a plurality of security appliances organized as a cluster. In response, the security appliance generates an operation context identifying the management operation to be performed. In addition, a secure encryption processor (SEP) of each security appliance generates a random nonce. The nonces are then assembled along with the operation context into a single message. The message is then cryptographically signed by an appropriate number of administrators using a cryptographic key associated with each administrator. The signed message is returned to the security appliances, where each security appliance examines the signed message and determines whether its nonce is present within the message. If so, the security appliance performs the desired management operation. However, if its nonce is not present in the signed message, the management operation is disallowed and not performed.

13 Claims, 6 Drawing Sheets

(56) References Cited

U.S. PATENT DOCUMENTS

| | | | |
|---|---|---|---|
| 5,870,468 | A | 2/1999 | Harrison |
| 5,931,947 | A | 8/1999 | Burns |
| 5,933,498 | A | 8/1999 | Schneck et al. |
| 5,940,507 | A | 8/1999 | Cane |
| 5,951,694 | A * | 9/1999 | Choquier et al. ............ 714/15 |
| 6,006,018 | A | 12/1999 | Burnett et al. |
| 6,073,237 | A | 6/2000 | Ellison |
| 6,134,660 | A | 10/2000 | Boneh et al. |
| 6,175,924 | B1 | 1/2001 | Arnold |
| 6,185,681 | B1 | 2/2001 | Zizzi |
| 6,185,684 | B1 | 2/2001 | Pravetz et al. |
| 6,189,109 | B1 * | 2/2001 | Sheikh et al. ............ 714/1 |
| 6,212,600 | B1 | 4/2001 | Friedman et al. |
| 6,249,866 | B1 | 6/2001 | Brundrett |
| 6,345,101 | B1 | 2/2002 | Shukla |
| 6,356,941 | B1 | 3/2002 | Cohen |
| 6,405,315 | B1 | 6/2002 | Burns et al. |
| 6,411,716 | B1 * | 6/2002 | Brickell ............ 380/286 |
| 6,414,884 | B1 | 7/2002 | DeFelice et al. |
| 6,507,911 | B1 | 1/2003 | Langford |
| 6,550,011 | B1 | 4/2003 | Sims, III |
| 6,606,690 | B2 | 8/2003 | Padovano |
| 6,625,734 | B1 | 9/2003 | Marvit et al. |
| 6,671,773 | B2 | 12/2003 | Kazar et al. |
| 6,684,222 | B1 | 1/2004 | Cornelius et al. |
| 6,735,693 | B1 | 5/2004 | Hamlin |
| 6,754,827 | B1 | 6/2004 | Cane et al. |
| 6,792,544 | B2 | 9/2004 | Hashem |
| 6,839,437 | B1 | 1/2005 | Crane et al. |
| 6,851,056 | B2 | 2/2005 | Evans |
| 6,857,076 | B1 | 2/2005 | Klein |
| 6,868,406 | B1 | 3/2005 | Ogg et al. |
| 6,895,429 | B2 | 5/2005 | Banga et al. |
| 6,915,435 | B1 | 7/2005 | Merriam |
| 6,993,661 | B1 | 1/2006 | Garfinkel |
| 7,003,674 | B1 | 2/2006 | Hamlin |
| 7,020,779 | B1 | 3/2006 | Sutherland |
| 7,093,127 | B2 | 8/2006 | McNulty et al. |
| 7,096,355 | B1 | 8/2006 | Marvit et al. |
| 7,120,696 | B1 | 10/2006 | Au et al. |
| 7,136,995 | B1 | 11/2006 | Wann |
| 7,146,505 | B1 | 12/2006 | Harada et al. |
| 7,185,205 | B2 | 2/2007 | Launchbury et al. |
| 7,215,771 | B1 | 5/2007 | Hamlin |
| 7,222,228 | B1 | 5/2007 | Stephens et al. |
| 7,240,197 | B1 | 7/2007 | Yamagami et al. |
| 7,260,724 | B1 | 8/2007 | Dickinson et al. |
| 7,318,093 | B2 | 1/2008 | Touboul |
| 7,340,500 | B2 | 3/2008 | Traversat et al. |
| 7,370,194 | B2 | 5/2008 | Morais et al. |
| 7,383,438 | B2 * | 6/2008 | Fahrny et al. ............ 713/169 |
| 7,428,749 | B2 * | 9/2008 | McGarvey et al. ............ 726/8 |
| 7,506,128 | B2 | 3/2009 | Deo |
| 7,512,800 | B2 * | 3/2009 | Hopkins ............ 713/172 |
| 7,593,532 | B2 | 9/2009 | Plotkin et al. |
| 7,646,867 | B2 | 1/2010 | Plotkin |
| 7,693,993 | B2 * | 4/2010 | Sheets et al. ............ 709/226 |
| 7,975,288 | B2 * | 7/2011 | Viavant et al. ............ 726/2 |
| 2001/0054155 | A1 | 12/2001 | Hagan et al. |
| 2002/0046286 | A1 | 4/2002 | Caldwell et al. |
| 2002/0073324 | A1 | 6/2002 | Hsu |
| 2002/0114453 | A1 | 8/2002 | Bartholet et al. |
| 2002/0120660 | A1 | 8/2002 | Hay et al. |
| 2003/0028765 | A1 | 2/2003 | Cromer et al. |
| 2003/0093413 | A1 | 5/2003 | Dettinger et al. |
| 2004/0153642 | A1 | 8/2004 | Plotkin et al. |
| 2005/0033988 | A1 | 2/2005 | Chandrashekhar et al. |
| 2005/0041812 | A1 | 2/2005 | Sundararajan et al. |
| 2005/0080761 | A1 | 4/2005 | Sundararajan et al. |
| 2005/0102498 | A1 | 5/2005 | Bojinov et al. |
| 2005/0114429 | A1 | 5/2005 | Caccavale et al. |
| 2007/0055891 | A1 | 3/2007 | Plotkin |
| 2007/0058801 | A1 | 3/2007 | Plotkin |
| 2007/0061432 | A1 | 3/2007 | Plotkin |
| 2007/0174634 | A1 | 7/2007 | Plotkin |

OTHER PUBLICATIONS

Blaze, "A cryptographic File System for Unix," Proceedings of the First ACM Conference on Computer and Communications Security, pp. 9-16 (1993).

Blaze, "Key Management in an Encrypting File System," USENIX Summer 1994 Technical Conference, pp. 27-35, (Jun. 6-10, 1994).

Boneh, et al., "A Revocable Backup System," In Proceedings 6th USENIX Security Conference, pp. 91-96, 1996.

Cattaneo, et al. "The Design and Implementation of a Transparent Cryptographic Filesystem for UNIX," Proceedings of the FREENIX Track: 2001 UNIX Annual Technical Conference. pp. 199-212 (Jun. 25-30, 2001).

Christy, et al., "Mechanism for Secure Off-Site Computer Access," IBM Technical Disclosure Bulletin. pp. 6754-6756. Apr. 1985.

Clark, "Physical Protection of Cryptographic Devices," Lecture Notes in Computer Science. Advances in Cryptology—EUROCRYPT '87, pp. 83-93 (Apr. 13-15, 1987).

Coleman et al., "Mass Storage System Reference Manual: Version 4," Technical Committee on Mass Storage Systems and Technology, IEEE, pp. 1-38, May 1990.

Comba, "Approaches to Cryptographic Key Management," Symposium on Applied Computing. Proceedings of the Northeast ACM Symposium on Personal Computer Security, pp. 38-45 (1986).

Decru, Inc., "Decru Datafort.TM. Storage Security Appliances", .COPYRGT. 2004, 2 pages.

Decru, Inc., "Decru Datafort.TM. E-Series Storage Security Appliances—Transparent Data Security for Network Attached Storage (NAS)", .COPYRGT. 2004, 2 pages.

Decru, Inc., "Decru Datafort FC-Series Storage Security Appliances—Comprehensive Security for Storage Area Networks and Tape Backup", .COPYRGT. 2004, 2 pages.

Denning, "Cryptography and Data Security," Addison-Wesley Publishing Co., pp. 164-169 and 179, 1982.

Di Crescenzo, et al., "How to Forget a Secret (Extended Abstract)," 16th Annual Symposium on Theoretical Aspects of Computer Science, pp. 500-509 (Mar. 4-6, 1999).

Dietrich, "Security Enclosure With Elastomeric Contact Stripes," IBM Technical Disclosure Bulletin, pp. 444-445, Feb. 1991.

"Disappearing Inc. Makes Old Email Vanish Everywhere; Reduces Corporate Liability as well as Improves Corporate Productivity by Enabling Sensitive Communications via Email-Company Business and Marketing," Edge: Work-Group Computing Report, http://findarticles.com/p/articJes/mLmOWUB/is_1999_0cU 1/aL 56260487/print (Oct. 11, 1999).

Double, "Encryption Key Security by Electric Field Destruction of Memory Cells," IBM Technical Disclosure Bulletin, pp. 8-11, Jan. 1989.

FIPS Pub 74, "Federal Information Processing Standards Publication 1981 Guidelines for Implementing and Using the NBS Data Encryption Standard," Federal Information Processing Standards Publication 74, National Institute of Standards and Technology, Apr. 1, 1981, 39 pages.

FIPS Pub 140-1, "Security Requirements for Cryptographic Modules," Federal Information Processing Standards Publication 140-1, National Institute of Standards and Technology, Jan. 11, 1994, 44 pages.

Flavin, et al., "Data Protection on Magnetic Media Via an Encrypting Controller," IBM Technical Disclosure Bulletin, vol. 3D, No. 3, pp. 1284-1285 (Aug. 1987).

Garfinkel, S., "PGP: Pretty Good Privacy," O'Reilly & Associates, pp. 43 and 65-67, Jan. 1995.

Garfinkel, S., "PGP: Pretty Good Privacy," O'Reilly & Associates, pp. 54-55, 151-153, Jan. 1995.

Garfinkel, S., "Omniva's Self-Destructing Email," Web Security, Privacy and Commerce, Second Edition, O'Reilly & Associates, Inc., Sebastopol, CA, pp. 280-283, Jan. 2002.

Gobioff, Howard, et al., "Security for Networked Attached Storage Devices," Carnegie Mellon University Computer Science Technical Report CMU-CS-97-185, Oct. 1997, 20 pages.

(56) References Cited

OTHER PUBLICATIONS

Gobioff, Howard, "Security for a High Performance Commodity Storage Subsystem," Carnegie Mellon University Computer Science Technical Report CMU-CS-99-160, Jul. 1999, 222 pages.

Gobioff, Howard, et al., "Smart Cards in Hostile Environments," Proceedings of the Second USENIX Workshop on Electronic Commerce, pp. 23-28 (Nov. 18-21, 1996).

Graham, et al, "Data Protection at the Volume Level," IBM Technical Disclosure Bulletin, pp. 146-148, Oct. 1988.

Gutmann, "Secure Deletion of Data from Magnetic and Solid-State Memory," Proceedings of the Sixth Annual USENIX Security Symposium: Focusing on Applications of Cryptography, pp. 7-89 (Jul. 22-25, 1996).

Hwang, et al., "An Access Control Scheme Based on Chinese Remainder Theorem and Time Stamp Concept," Computers & Security, vol. 15. No. 1. pp. 73-81, 1996.

IBM Crypto Server Management General Information Manual, First Edition (May 2000), 16 pages.

IBM SecureWay Cryptographic Products IBM 4758 PCI Cryptographic Coprocessor Installation Manual, Security Solutions and Technology Department, Second Edition (Mar. 2000), 34 pages.

IBM Integrated Cryptographic Coprocessors for IBM eServer zSeries 900 and for IBM S/390 Servers (Data sheet), 2000, 4 pages.

IBM SecureWay, UltraCypher Cryptographic Engine (Datasheet) (1998), 2 pages.

IBM 4758 PCI Cryptographic Coprocessor Custom Software Installation Manual, Second Edition, Jan. 2001, 30 pages.

Avoid Litigation: Encrypt Your Data, InfoTech Research Group, Sep. 19, 2006, 6 pages.

Johnson et al., "Self-Destructing Diskette," IBM Technical Disclosure Bulletin, vol. 33, No. 1A, pp. 218-219 (Jun. 1990).

Kher, et al., "Securing Distributed Storage: Challenges, Techniques, and Systems", Nov. 2005.

Mallett, "Considerations for Applying Disk Encryptors 10 Environments Subject to Hostile Overrun," IEEE, pp. 218-222, 1991.

Mauriello, "TCFS: Transparent Cryptographic File system," LINUX Journal, Aug. 1, 1997, 8 pages.

Menezes et al., "Handbook of Applied Cryptography," CRC Press, Section 13.7.1, 4 pages, 1997.

Moore, "Preventing Access to a Personal Computer," IBM Technical Disclosure Bulletin, pp. 98-100, Sep. 1992.

Omniva Policy Systems, www.omniva.com, (Aug. 2004), downloaded from web.archive.org on Aug. 24, 2004, 19 pages.

Provos, Niels, "Encrypting Virtual Memory," CITI Technical Report 00-3, Center for Information Technology Integration, University of Michigan, Apr. 25, 2000, 11 pages.

Scherzer. "Memory Protection in Chip Cards," IBM Technical Disclosure Bulletin, pp. 416-417, Oct. 1989.

Schneier, "Applied Cryptography Second Edition: Protocols, Algorithms, and Source Code in C," John Wiley & Sons, Inc. pp. 5, 15, 179-181, 185, 213-214, 225, 229, 563-566 and 569. 1996.

Slusarczuk et al., "Emergency Destruction of Information Storage Media," Institute for Defense Analysis, IDA Report R-321, Dec. 1987, 196 pages.

Smith, "Verifying Type and Configuration of an IBM 4758 Device: A While Paper," IBM T.J. Watson Research Center pp. 1-7 (218/00).

Smith et al., "IBM Research Report: Building a High-Performance, Programmable Secure Coprocessor," IBM Research Division, Computer Science/Mathematics, RC 21102(94393) (Feb. 19, 1998), 61 pages.

Stinson, Douglas R., "Cryptography: Theory and Practice," CRC Press, Mar. 1, 1995, 228 pages.

Vernam, "Cipher Printing Telegraph Systems for Secret Wire and Radio Telegraphic Communications," Journal of the AI EE. pp. 109-115, Feb. 1926.

Weingart, "Physical Security for the uABYSS System," Proceedings 1987 IEEE Symposium on Security and Privacy, pp. 2-58 (Apr. 27-29, 1987), pp. 52-58.

Whitten et al., "Usability of Security: A Case Study," CMU Computer Science Technical Report CMU-CS-98-155. pp. 1-39, Dec. 18, 1998.

Yee et al., "Secure Coprocessors in Electronic Commerce Applications," Proceedings of the First USENIX Workshop of Electronic Commerce, pp. 155-170, Jul. 11-12, 1995.

Yeh et al., "S/390 CMOS Cryptographic Coprocessor Architecture: Overview and Design Considerations," IBM J. Res. Develop., vol. 43, No. 5/6, pp. 777-794 (Sep./Nov. 1999).

Zadok et al., "Cryptfs: A Stackable Vnode Level Encryption File System," Computer Science Department, Columbia University, CUCS-021-98, pp. 1-14, Jun. 1998.

\* cited by examiner

SYSTEM AND METHOD FOR SIGNING A MESSAGE TO PROVIDE ONE-TIME APPROVAL TO A PLURALITY OF PARTIES

FIELD OF THE INVENTION

The present invention relates to security appliances, and more specifically, to batch signing a message authorizing administrative operations on one or more security appliances.

BACKGROUND OF THE INVENTION

A storage system is a computer that provides storage services relating to the organization of information on writable persistent storage devices, such as memories, tapes or disks. The storage system is commonly deployed within a storage area network (SAN) or a network attached storage (NAS) environment. When used within a NAS environment, the storage system may be embodied as a file server including an operating system that implements a file system to logically organize the information as a hierarchical structure of data containers, such as files on, e.g., the disks. Each "on-disk" file may be implemented as a set of data structures, e.g., disk blocks, configured to store information, such as the actual data (i.e., file data) for the file.

The storage system may be further configured to operate according to a client/server model of information delivery to thereby allow many client systems (clients) to access shared resources, such as files, stored on the storage system. Sharing of files is a hallmark of a NAS system, which is enabled because of its semantic level of access to files and file systems. Storage of information on a NAS system is typically deployed over a computer network comprising a geographically distributed collection of interconnected communication links, such as Ethernet, that allow clients to remotely access the information (files) on the filer. The clients typically communicate with the storage system by exchanging discrete frames or packets of data according to pre-defined protocols, such as the Transmission Control Protocol/Internet Protocol (TCP/IP).

In the client/server model, the client may comprise an application executing on a computer that "connects" to the storage system over a computer network, such as a point-to-point link, shared local area network, wide area network or virtual private network implemented over a public network, such as the Internet. NAS systems generally utilize file-based access protocols; therefore, each client may request the services of the storage system by issuing file system protocol messages (in the form of packets) to the file system over the network identifying one or more files to be accessed without regard to specific locations, e.g., blocks, in which the data are stored on disk. By supporting a plurality of file system protocols, such as the conventional Common Internet File System (CIFS) and the Network File System (NFS) protocols, the utility of the storage system may be enhanced for networking clients.

A SAN is a high-speed network that enables establishment of direct connections between a storage system and its storage devices. The SAN may thus be viewed as an extension to a storage bus and, as such, an operating system of the storage system enables access to stored data using block-based access protocols over the "extended bus". In this context, the extended bus is typically embodied as Fibre Channel (FC) or Ethernet media adapted to operate with block access protocols, such as Small Computer Systems Interface (SCSI) protocol encapsulation over FC (e.g., FCP) or TCP (iSCSI).

SCSI is a peripheral input/output (I/O) interface with a standard, device independent protocol that allows different peripheral devices, such as disks, to attach to a storage system. In SCSI terminology, clients operating in a SAN environment are "initiators" that initiate commands and requests to access data. The storage system is thus a "target" configured to respond to the data access requests issued by the initiators in accordance with a request/response protocol. The initiators and targets have endpoint addresses that, in accordance with the FC protocol, comprise worldwide names (WWN). A WWN is a unique identifier, e.g., a node name or a port name, consisting of an 8-byte number.

A SAN arrangement or deployment allows decoupling of storage from the storage system, such as an application server, and some level of information storage sharing at the storage system level. There are, however, environments wherein a SAN is dedicated to a single storage system. In some SAN deployments, the information is organized in the form of databases, while in others a file-based organization is employed. Where the information is organized as files, the client requesting the information maintains file mappings and manages file semantics, while its requests (and storage system responses) address the information in terms of block addressing on disk using, e.g., a logical unit number (lun).

A network environment may be provided wherein information (data) is stored in secure storage served by one or more storage systems coupled to one or more security appliances. Each security appliance is embodied as a computer configured to transform unencrypted data (cleartext) generated by clients (or initiators) into encrypted data (ciphertext) destined for secure storage or "cryptainers" on the storage system (or target). As used herein, a cryptainer is a piece of storage on a storage device, such as a disk, in which the encrypted data is stored. In the context of a SAN environment, a cryptainer can be, e.g., a disk, a region on the disk or several regions on one or more disks that, in the context of a SAN protocol, is accessible as a lun. In the context of a NAS environment, the cryptainer may be a collection of files on one or more disks. Specifically, in the context of the CIFS protocol, the cryptainer may be a share, while in the context of the NFS protocol, the cryptainer may be a mount point. In a tape environment, the cryptainer may be a tape containing a plurality of tape blocks.

Each cryptainer is associated with its own encryption key, e.g., a cryptainer key, which is used by the security appliance to encrypt and decrypt the data stored on the cryptainer. An encryption key is a code or number which, when taken together with an encryption algorithm, defines a unique transformation used to encrypt or decrypt data. Data remains encrypted while stored in a cryptainer until requested by an authorized client. At that time, the security appliance retrieves the encrypted data from the cryptainer, decrypts it and forwards the unencrypted data to the client.

It is often advisable that certain sensitive administrative operations of a security appliance be limited to prevent the occurrence of security breaches by, e.g., the compromising of an administrator of the security appliance. A single administrator having the authority to perform all administrative operations on the security appliance becomes a single point of failure. The administrator may be corrupted by, e.g., bribery, blackmail, etc., to relinquish secure information and/or to limit the security features of the appliance. For sensitive operations, it is thus desirous to require the authorization of more than a single administrator to perform certain administrative operations to thereby increase the secure nature of the security appliance. For example, the security appliance may be associated with five administrators, any three of which are required to authorize certain secure administrative operations. Such an authorization may be granted by requiring that each administrator perform a cryptographic authentication operation such as, e.g., securely signing a message indicating approval of the operation by that administrator. Once in possession of the requisite number of signed messages, the security appliance may perform the operation.

However, a noted disadvantage of such an authorization arrangement arises in systems utilizing a cluster of security appliances. In a cluster environment, a plurality of administrators may be required to authorize the same operation for each security appliance in the cluster, thereby requiring a significant number of cryptographic authentication operations. Yet the time required to perform a single cryptographic authentication operation may be substantial, resulting in an unacceptable level of delay when requiring authorization of each administrator for each security appliance in the cluster.

SUMMARY OF THE INVENTION

The disadvantages of the prior art are overcome by providing a system and method for batch signing of a message to provide one-time approval to a plurality of parties. An administrator initiates a management operation directed to a plurality of security appliances organized as a cluster. The management operation is illustratively initiated by logging into one of the security appliances. In response, the security appliance generates an operation context identifying the management operation to be performed. In addition, a secure encryption processor (SEP) of each security appliance generates a random nonce. The nonces are then assembled along with the operation context into a single message. Illustratively, the message contains a series of entries, wherein each entry comprises an identifier of the entity (e.g., a SEP) generating the nonce as well as the nonce itself.

The message is then cryptographically signed by an appropriate number of administrators using a cryptographic key associated with each administrator. The signed message is then returned to the security appliances, where each security appliance examines the signed message and determines whether its nonce is present within the signed message. If so, the security appliance performs the desired management operation. However, if its nonce is not present in the signed message, the management operation is disallowed and thus not performed.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

The present invention provides a system and method for signing a message to provide one-time approval to a plurality of parties. By utilizing the present invention, administrative operations directed to a plurality of security appliances (or other entities) may be authorized using a single operation. This obviates the need for individual authorizations directed to each of the parties from a plurality of administrators. As such, the total number of cryptographic authorization operations is reduced, thereby reducing the processing load on cryptographic processors.

A. Security Appliance Environment

Figure 1:
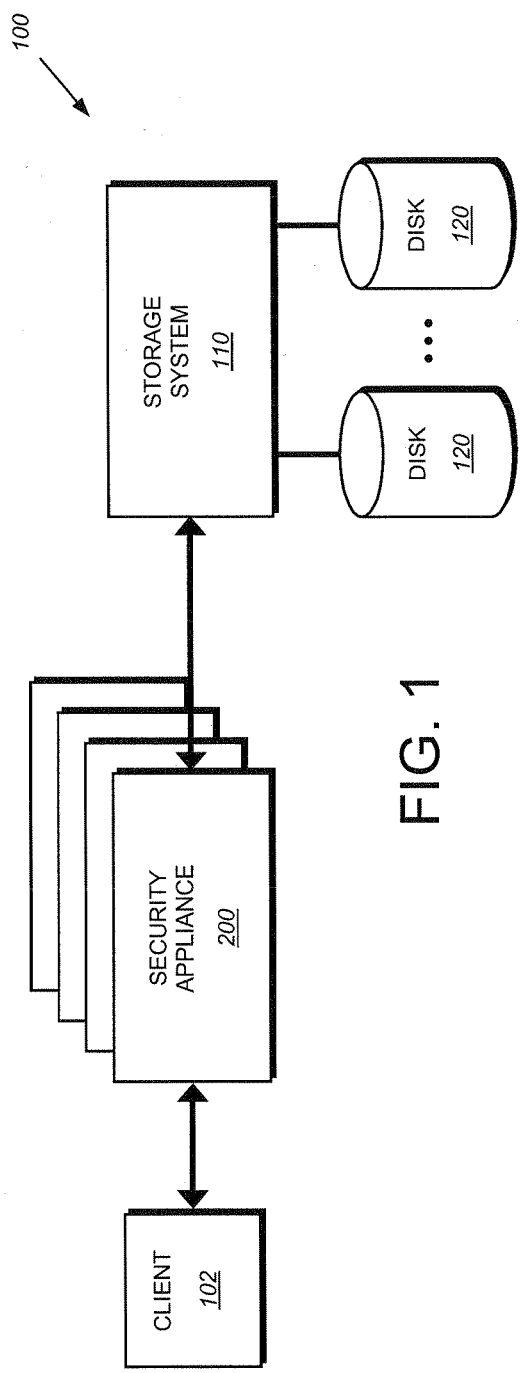
FIG. 1 is a schematic block diagram of an environment including a multi-protocol security appliance cluster that may be advantageously used with the present invention.

FIG. 1 is a schematic block diagram of an environment 100 including a plurality of security appliances 200 organized as a cluster that may be advantageously used with the present invention. It should be noted that in alternative embodiments, the functionality of security appliances 200 and storage systems 110 may be integrated into a single computer. As such, the description of these systems as separate computers should be taken as exemplary only. Each security appliance 200 is coupled between one or more clients 102 and one or more storage systems 110. The security appliance 200, which is configured to act as an encryption proxy, intercepts a data access request issued by client 102 and destined for the storage system 110, wherein the data access request may be a read request to retrieve certain data stored on storage devices, such as disks 120, coupled to the storage system 110 or a write request to store data on the disks. In the case of a write request, the security appliance 200 intercepts the request, encrypts the data associated with the request and forwards the encrypted data to the storage system 110 for storage at a specified location (address) on disk 120. In the case of a read request, the security appliance intercepts the request and forwards it onto the storage system, which returns the requested data to the appliance in encrypted form. The security appliance 200 then decrypts the encrypted data and returns the decrypted data to the client 102.

In the illustrative embodiment, the security appliance employs a conventional encryption algorithm, e.g., the Advanced Encryption Standard (AES) or other appropriate algorithms, to transform unencrypted data (cleartext) generated by the clients 102 into encrypted data (ciphertext) intended for secure storage, i.e., one or more cryptainers, on the storage system 110. To that end, the security appliance illustratively uses a highquality, software or hardware-based pseudo random number generation technique to generate encryption keys. The encryption and decryption operations are performed using these encryptions keys, such as a cryptainer key associated with each cryptainer. As described herein, the security appliance 200 uses an appropriate cryptainer key to encrypt or decrypt portions of data stored in a particular cryptainer. In addition to performing encryption and decryption operations, the security appliance 200 also performs access control, authentication, virtualization, and secure-logging operations.

B. Security Appliances

Figure 2:
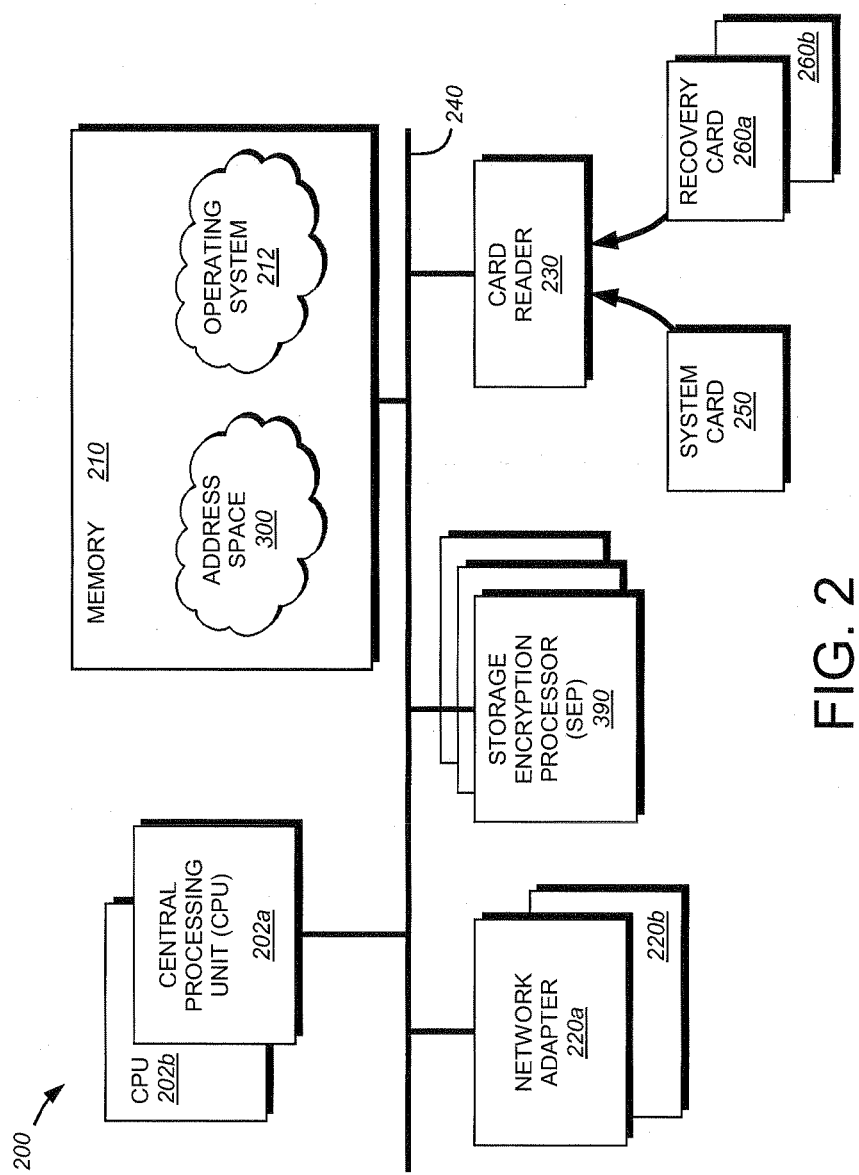
FIG. 2 is a schematic block diagram of a multi-protocol security appliance that may be advantageously used with the present invention.

FIG. 2 is a schematic block diagram of the multi-protocol security appliance 200 that may be advantageously used with the present invention. As used herein, a security appliance denotes a computer having features such as simplicity of security service management for users (system administrators) and clients of network attached storage (NAS) and storage area network (SAN) deployments. The security appliance comprises one or more processors, e.g., central processing units (CPU 220a,b), a memory 210, one or more network adapters 220a,b, one or more storage encryption processors (SEP 390) and a card reader 230 interconnected by a system bus 240, such as a conventional Peripheral Component Interconnect (PCI) bus. The SEP 390 is configured to perform all encryption and decryption operations for the security appliance in a secure manner; for example, the SEP is configured to protect plaintext encryption keys from system software executing on each CPU 202. Accordingly, the SEP is illustratively embodied as a FIPS 140-2 certified module that is connected to a dedicated interface card or other similar card.

The card reader 230 provides an interface for one or more "smart" recovery cards 260 a, b for use in authorizing invocation of certain administrative operations in accordance with an illustrative embodiment of the present invention. Encryption keys may be exchanged between the SEP 390 and system card 250, where they are "secret shared" (cryptographically assigned) to the recovery cards 260 as recovery encryption keys. A quorum setting for the recovery cards 260 may be provided such that the recovery keys stored on the recovery cards are backed up in a threshold scheme whereby, e.g., any 2 of 5 cards are required to perform certain operations. Note that the secret shares are not stored as such on the recovery cards, but rather are encrypted with a key that is assigned to each of the recovery cards. Therefore, the secret shares are "cryptographically assigned" to the recovery cards 260.

In accordance with an illustrative embodiment of the present invention, each of the recovery cards is associated with a recovery officer, who is granted administrative permissions. A predefined number of the recovery officers are required to authorize certain highly sensitive operations, as described further below.

The network adapters 220 couple the security appliance 200 between one or more clients 102 and one or more storage systems 110 over point-to-point links, wide area networks, virtual private networks implemented over a public network (Internet) or shared local area networks. In a SAN environment configured to support various Small Computer Systems Interface (SCSI)-based data access protocols, including SCSI encapsulated over TCP (iSCSI) and SCSI encapsulated over FC (FCP), the network adapters 220 may comprise host bus adapters (HBAs) having the mechanical, electrical and signaling circuitry needed to connect the appliance 200 to, e.g., a FC network. In a NAS environment configured to support, e.g., the conventional Common Internet File System (CIFS) and the Network File System (NFS) data access protocols, the network adapters 220 may comprise network interface cards (NICs) having the mechanical, electrical and signaling circuitry needed to connect the appliance to, e.g., an Ethernet network.

The memory 210 illustratively comprises storage locations that are addressable by the processors and adapters for storing software programs and data structures associated with the present invention. The processor and adapters may, in turn, comprise processing elements and/or logic circuitry configured to execute the software programs and manipulate the data structures. An operating system 212, portions of which is typically resident in memory and executed by the processing elements, functionally organizes the appliance 200 by, inter alia, invoking security operations in support of software processes and/or modules implemented by the appliance. It will be apparent to those skilled in the art that other processing and memory means, including various computer readable media, may be used for storing and executing program instructions pertaining to the invention described herein.

Figure 3:
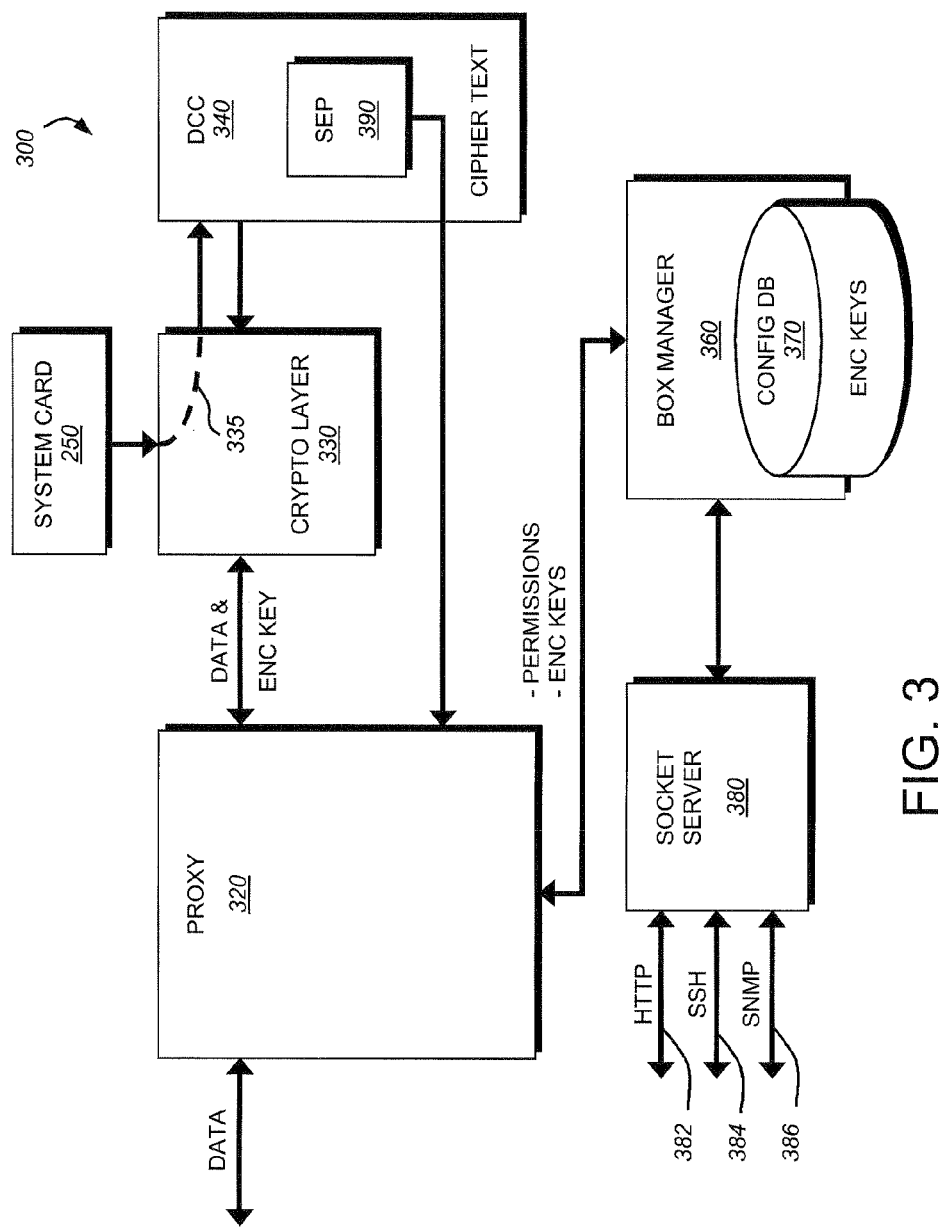
FIG. 3 is a schematic diagram illustrating an arrangement of software processes and modules executing on the security appliance in accordance with an illustrative embodiment of the present invention.

The operating system 212 illustratively organizes the memory 210 into an address space arrangement available to the software processes and modules executing on the processors. FIG. 3 is a schematic diagram illustrating an arrangement 300 of software processes and modules executing on the security appliance 200 in accordance with the present invention. In the illustrative embodiment, the operating system software is a customized version of a Unix type operating system, although other operating systems may be used.

For both NAS and SAN environments, data is received at a proxy 320 of the security appliance. The proxy 320 is illustratively embodied as, e.g., a network protocol stack configured to interpret the protocol over which data is received and to enforce certain access control rules based on one or more policies. Each policy is served by a box manager 360. The box manager 360 is illustratively embodied as a database application process configured to manage a configuration repository or database (Config DB 370) that stores, e.g., encrypted key. A socket server 380 provides interfaces to the box manager 360, including (i) an HTTP web interface 382 embodied as, e.g., a graphical user interface (GUI) adapted for web-based administration, (ii) a SSH interface 384 for command line interface (CLI) command administration, and (iii) an SNMP interface 386 for remote management and monitoring.

Specifically, the box manager 360 supplies the permissions and encrypted keys to the proxy 320, which intercepts data access requests and identifies the sources (clients 102) of those requests, as well as the types of requests and the storage targets (cryptainers) of those requests. The proxy also queries the box manager for permissions associated with each client and, in response, the box manager 360 supplies the appropriate permissions and encrypted key (e.g., a cryptainer key). The proxy 320 then bundles the data together with the encrypted key and forwards that information to a crypto process (layer) 330 that functions as a "wrapper" for the SEP 390. Illustratively, SEP 390 resides on an interface card, which is hereinafter referred to a data crypto card (DCC 340).

The crypto layer 330 interacts with the DCC 340 by accessing (reading and writing) registers on the DCC and, to that end, functions as a PCI interface. Illustratively, a descriptor queue is used by the crypto layer to access the DCC by, e.g., supplying starting and ending points of data, as well as offsets into the data and the encrypted keys used to encrypt the data. The DCC 340 includes one or more previously loaded keys used to decrypt the supplied encrypted keys; upon decrypting an encrypted key, the DCC uses the decrypted key to encrypt the supplied data. Upon completion of encryption of the data, the DCC returns the encrypted data as ciphertext to the proxy 320, which forwards the encrypted data to the storage system 110.

Notably, the security appliance 200 "virtualizes" storage such that, to a client 102, the appliance appears as a storage system 110 whereas, from the perspective of the storage system, the security appliance appears as a client. Such virtualization requires that security appliance manipulate (IP) addresses with respect to data access requests and responses. Illustratively, certain customizations to the network protocol stack of the proxy 320 involve virtualization optimizations provided by the appliance. For example, the security appliance 200 manipulates (changes) the source and destination IP addresses of the data access requests and responses.

In the illustrative embodiment, the encrypted key, e.g., a cryptainer key, exchanged between the proxy 320, box manager 360 and crypto layer 330 is encrypted by a domain key. In addition, the previously loaded key used by the DCC 340 (or, more specifically, the SEP 390) to decrypt the encrypted cryptainer key is a domain key previously supplied to the SEP via the system card 250.

C. Recovery Keys

Figure 4:
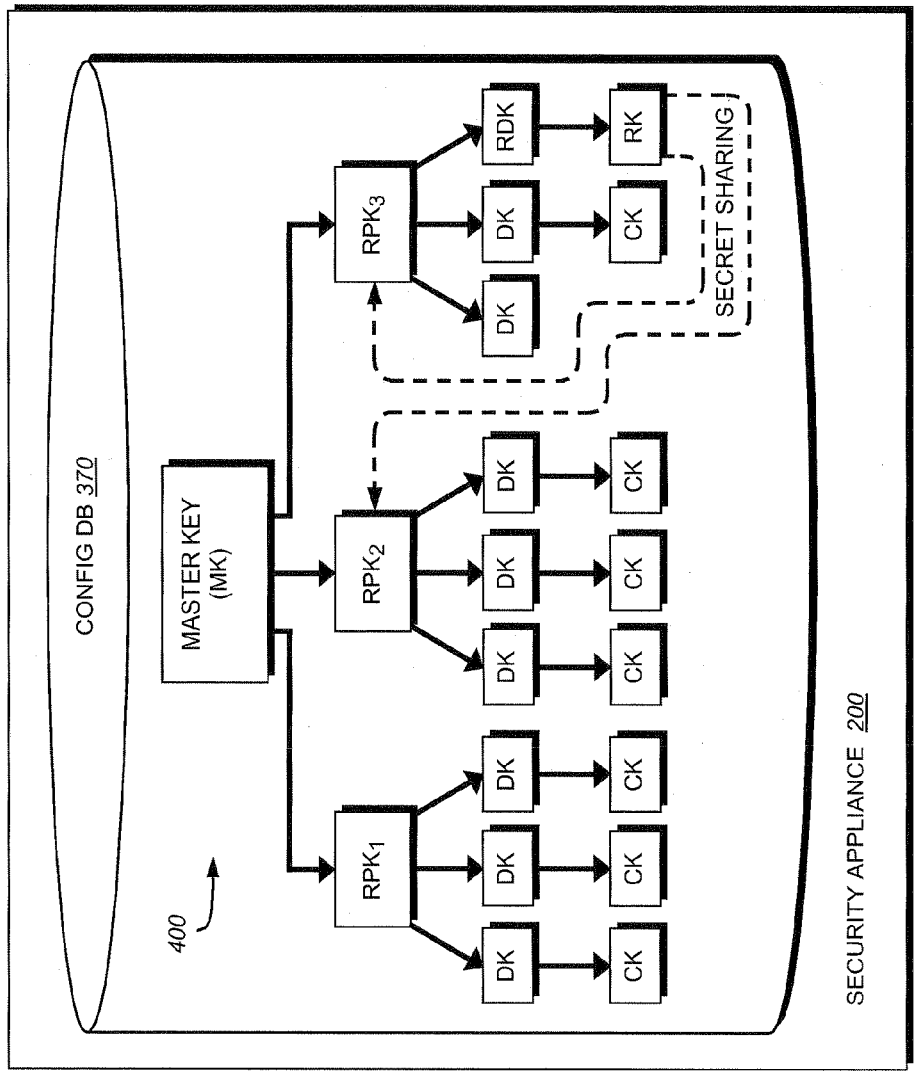
FIG. 4 is a schematic block diagram illustrating a key hierarchy in accordance with an illustrative embodiment of the present invention.

FIG. 4 is a schematic block diagram illustrating an illustrative key hierarchy 400. The keys used by security appliance 200 are illustratively created during a boot process. At that time, the key hierarchy 400 is also created, generally in response to user interaction with the security appliance via, e.g., an initialization wizard of the GUI. Notably, there are one or more recovery policy keys (e.g., $RPK_1$, $RPK_2$, $RPK_3$) in the key hierarchy 400. Recovery policy keys may impose limits on retrieval of keys wrapped by them, e.g., keys wrapped by the third recovery policy key $RPK_3$ may be recoverable and may be exported to the software modules, e.g., executing on the security appliance 200. Wrapping, in this context, denotes encryption and signing; each key illustratively includes an encryption component, a signature component and various metadata of a package. Thus, to "wrap" a second key with a first key means that the encryption component of the first key is used to encrypt both encryption and signature components of the second key, and the signature component of the first key is used to sign the entire second key (encryption and signature components, as well as the metadata). To "unwrap" a key, a reverse of the above operation is followed.

In the illustrative embodiment, the keys wrapped by each of the recovery policy keys are domain keys DK which, in turn, are used to wrap cryptainer keys CK. These keys are generated by the SEP in response to commands issued by the software modules to generate those keys. Note that each time the SEP generates a key "below" the master key level of the key hierarchy 400, the SEP 390 wraps the generated key with the key directly "above" it in hierarchy and then exports (stores) the wrapped key to the configuration database 370.

One or more recovery cards 260 are utilized to generate one or more recovery keys. Each recovery key illustratively comprises an ID, a symmetric AES key component and an HMAC signing key component. Each recovery card 260 sends its recovery key RK to the SEP 390. One of the domain keys, i.e., the recovery domain key RDK, is designated (dedicated) for use with storing the recovery key; the SEP wraps each recovery key RK with this dedicated recovery domain key RDK. The SEP 390 uses the stored recovery key RK to encrypt "secret shares".

Illustratively, the SEP uses a threshold scheme to convert the second and third recovery policy keys $RPK_2$, and $RPK_3$ into secret shares SS, with each share assigned to one recovery card 260. To ensure that only the correct card can access its share of the recovery policy keys, the share assigned to each card is further wrapped by the recovery key RK assigned to that card. The wrapped shares are exported by the SEP. In order to recover the second and third recovery policy keys $RPK_2$, and $RPK_3$, each wrapped share is loaded into the appropriate recovery card 260, which then unwraps the share. The unwrapped shares of the threshold, or quorum, may thereafter be combined to reconstitute the recovery policies. Essentially, this enables use of the recovery cards to recover the recovery policy keys. With these keys, all keys below those recovery policy keys in the key hierarchy may be unwrapped from a copy.

As noted, a quorum of recovery cards is needed to recover any keys within the key hierarchy. Similarly, a quorum of recovery cards is required to authorize certain sensitive administrative operations, as described further below.

D. Batch Signing

A system and method for batch signing of a message to provide one-time approval of the message to a plurality of parties is provided. An administrator initiates a management operation directed to a plurality of security appliances organized as a cluster. The management operation is illustratively initiated by logging into one of the security appliances. In response, the security appliance generates an operation context identifying the management operation to be performed. In addition, a secure encryption processor (SEP) of each security appliance generates a random nonce. As used herein, a nonce is a randomly generated number of a predefined size utilized to establish the uniqueness of a cryptographic operation. Illustratively, the nonces may be generated using any acceptable technique for generating a random (or pseudo-random) number. The nonces, along with an identifier of the party generating each nonce, are then assembled by one of the security appliances along with the operation context into a single message. Illustratively, the message contains a series of entries, wherein each entry comprises an identifier of the entity (e.g., a SEP) generating the nonce as well as the nonce itself.

The message is then cryptographically signed by an appropriate number of administrators using a cryptographic key associated with each administrator. The signed message is then returned to the security appliances, where each security appliance examines the signed message and determines whether its nonce is present within the signed message. If so, the security appliance performs the desired management operation. However, if its nonce is not present in the signed message, the management operation is disallowed and thus not performed.

Figure 5:
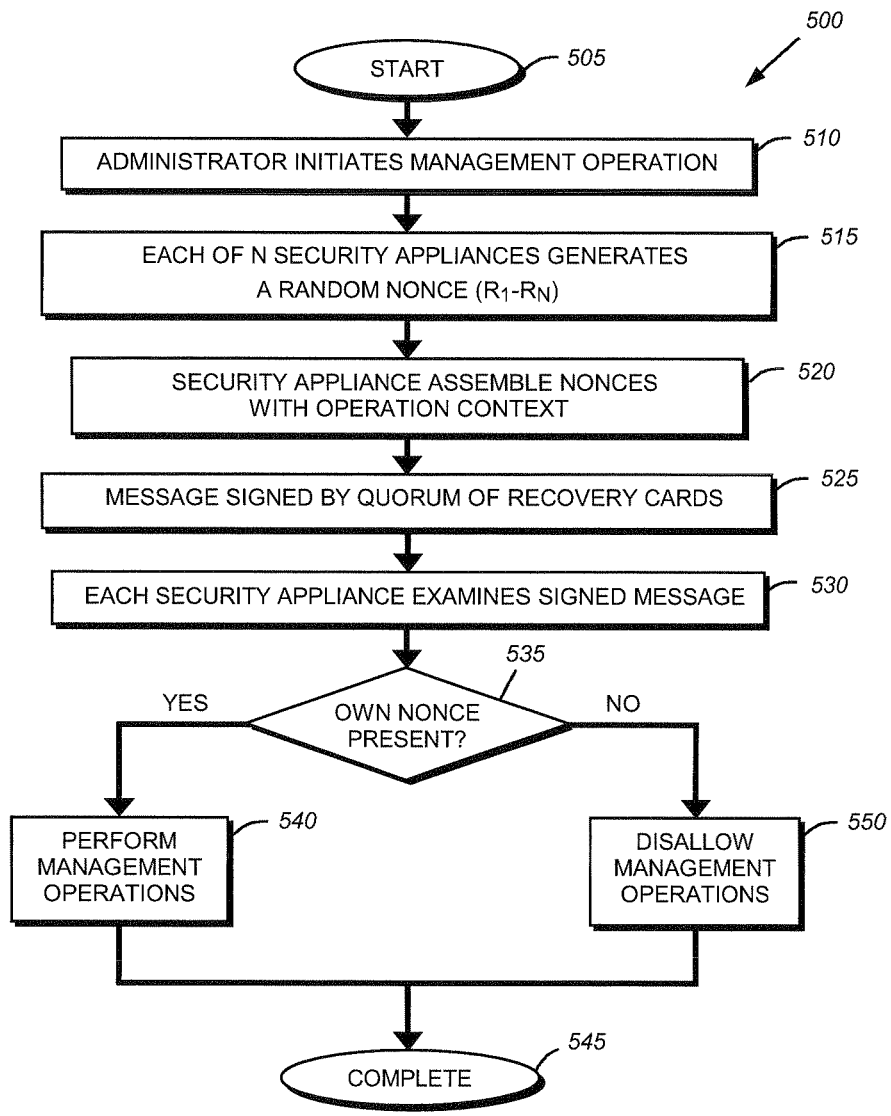
FIG. 5 is a flow chart illustrating the steps of a procedure for authorizing an administrative operation utilizing batch of signing in accordance with an illustrative embodiment of the present invention.

FIG. 5 is a flow chart detailing the steps of a procedure 500 for authorizing an administrative operation utilizing batch signing in accordance with an illustrative embodiment of the present invention. The procedure 500 begins in step 505 and continues to step 510 where an administrator initiates a management (or other administrative) operation. Such an operation may include, e.g., the addition of a security appliance to the cluster, etc. The management operation may be initiated by logging into one of the security appliances or may be performed, e.g., from an administrative console (not shown) operatively interconnected with a security appliance. Illustratively, the management operation is directed to a plurality of (e.g., n) security appliances. It should be noted that while the present invention is written in terms of authorizing operations on a plurality of security appliances, the principles of the present invention apply to other entities, e.g., SEPs. Thus, a single security appliance may contain a plurality of SEPs. In such a case, an operation may be directed to the plurality of SEPs. Furthermore, in alternate embodiments, other entities, other than security appliances and/or SEPs may be utilized.

In response, in step 515, each of the n security appliances generates a random nonce ($R_1$-$R_N$). As noted, the nonces may be generated using any acceptable technique to generate a random (or pseudo-random) number. Illustratively, the SEP 390 may generate the nonce using, e.g., an integrated random number generator. In accordance with an illustrative embodiment of the present invention, each nonce is utilized for only a single approval action, thereby preventing replay attacks directed to the cluster. One of the security appliances then assembles the nonces along with an operation context into a message data structure in step 520. An exemplary message data structure 600 is described further below in reference to FIG. 6. The nonces may be assembled by, e.g., collecting the nonces and identification information from each of the security appliances by a selected security appliance. The selected security appliance then forms the message data structure 600 in memory 210. In alternative embodiments, a plurality of message data structures 600 may be generated, e.g., one for each recovery card to sign. In such alternative embodiments, the plurality of messages may be formed by a single security appliance or by a plurality of security appliances. The generated message data structure 600 is signed by a quorum of the appropriate recovery cards in step 525. It should be noted that the description of recovery officers being associated with recovery cards is for illustrative purposes and that the principles of the present invention are applicable to any set of administrators signing the generated message data structure 600 using any acceptable cryptographic signing technique. As such, the present invention should not be interpreted to be limited to recovery officers and/or recovery cards signing the message data structure. Furthermore, it should be noted that in alternative embodiments of the present invention, a plurality of messages may be utilized, e.g., each security appliance may sign a separate message. As long as the operation context and the set of nonces are contained in each of the separate messages, a plurality of messages may be utilized in place of a single message. As such, the description of a single message should be taken as exemplary only.

Once the message has been signed by the quorum of recovery cards, each security appliance may examine the signed message in step 530 by, e.g., verifying the signatures associated with the signed message. That is, each security appliance may determine that the appropriate number of recovery officers signed the message and that the cryptographic signatures are correct. Each security appliance then determines whether its generated nonce is present within the signed message in step 535. If its nonce is included within the signed message, the security appliance then performs the appropriate management operation at 540 before the process 500 completes in step 515. However, if in step 535 is determined that the nonce for a particular security appliance is not present, the procedure 500 branches to step 550 where execution of the management operation is disallowed before completing in step 545.

Figure 6:
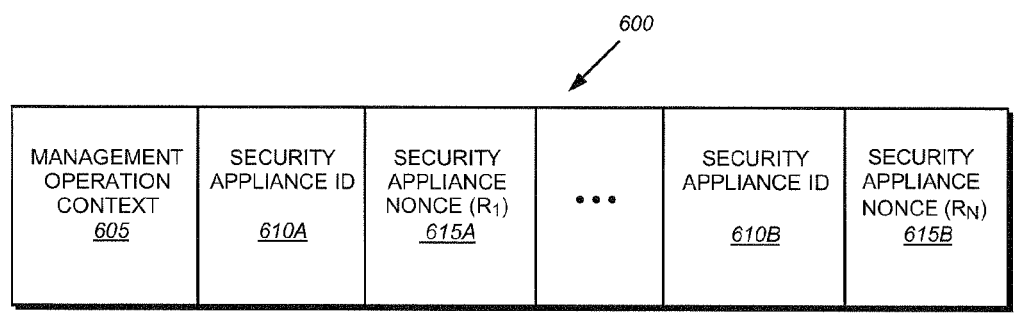
FIG. 6 is a schematic block diagram of an exemplary message data structure in accordance with an embodiment of the present invention.

FIG. 6 is a schematic block diagram of an exemplary message data structure 600 in accordance with an illustrative embodiment of the present invention. As noted, one or more of the security appliances assemble a message data structure 600 by collecting the various nonces and identifiers of security appliances and assembling the data structure in memory. Illustratively the message data structure 600 includes a management operation context field 605 and a plurality of entries, wherein each entry comprises a security appliance ID field 610 and security appliance nonce field 615. Illustratively, the management operation context field 605 contains an identifier of the management operation associated with the message data structure 600. For example, the operation context may identify the operation to be authenticated. Each security appliance ID field 610 stores an identifier of a security appliance to which the message is directed. The nonce field 615 stores the randomly generated nonce from the associated security appliance. Thus, in accordance with the illustrative embodiment when a security appliance examines a signed message to determine if its nonce is present, it may locate its nonce by finding its identifier within the data structure 600.

The foregoing description has been directed to specific embodiments of this invention. It will be apparent, however, that other variations and modifications may be made to the described embodiments, with the attainment of some or all of their advantages. For instance, it is expressly contemplated that the procedures, processes, layers and/or modules described herein may be implemented in hardware, software, embodied as a computer-readable medium having executable program instructions, firmware, or a combination thereof. Furthermore, while the present invention has been written in terms of recovery officers and recovery keys, other forms of trusted entities may be utilized. For example, in a role based access control environment, entities having certain roles that are associated with appropriate encryption keys may be utilized in place of recovery officers. Thus, for example, the entities needed to authorize a particular operation may vary based on the operation, e.g., recovery officers are needed to authorize the replacement of a recovery card, while other officers may be required to authorize differing operations. As such, the description of recovery officers and recovery cards should be taken as exemplary only.

Additionally, while this description has been written in terms of the security appliances generating nonces, other entities may generate nonces. For example, in a security appliance having a plurality of SEPs, each SEP may generate its own nonce. Accordingly this description is to be taken only by way of example and not to otherwise limit the scope of the invention. Furthermore, while this description has been written in terms of authorizing a single operation at time, it will be appreciated by one skilled in the art that the principles of the present invention may be implemented in systems supporting a plurality of concurrent operations. In such alternative embodiments, each security appliance may maintain a data structure containing the operation contexts and associated nonces for that security appliance. As such, the description of the present invention authorizing only a single operation should be taken as exemplary only. Therefore, it is the object of the appended claims to cover all such variations and modifications as come within the true spirit and scope of the invention.

What is claimed is:

1. A method for batch signing, comprising:
   initiating a management operation to be performed on a plurality of storage systems, each storage system including an associated security appliance having a respective secure encryption processor, wherein the security appliance associated with each storage system of the plurality of storage systems together forming a plurality of security appliances;
   in response to initiating the management operation, generating an operation context identifying the management operation, the operation context generated by one of the plurality of security appliances;
   generating a different random nonce by each security appliance of the plurality of security appliances, the generation of each of the different random nonces together creating a plurality of the different random nonces;
   assembling the plurality of the different random nonces, a plurality of security appliance identifiers, and the operation context into a message by a first security appliance of the plurality of security appliances, each of the plurality of security appliance identifiers being associated with a respective security appliance;
   signing the message using a plurality of encryption keys required to authorize performance of the identified management operation;
   receiving the signed message by a particular security appliance of the plurality of security appliances;

in response to receiving the signed message by the particular security appliance, examining, by the particular security appliance, the signed message to determine whether a particular nonce associated with the particular security appliance is present in the signed message, wherein the particular nonce is one of the different random nonces generated by the particular security appliance;

in response to determining that the particular nonce is present in the signed message, performing, by the particular security appliance that received the signed message, the identified management operation; and in response to determining that the particular nonce is not present in the signed message, disallowing the particular security appliance from performing the identified management operation.

2. The method of claim 1 wherein the respective secure encryption processor at each security appliance generates each of the different random nonces.

3. The method of claim 1 wherein each of the plurality of required encryption keys is associated with a recovery card.

4. The method of claim 1 wherein the message comprises a plurality of messages, each of the plurality of messages including the plurality of the different random nonces and the plurality of security appliance identifiers.

5. A system for batch signing, comprising:
means for initiating a management operation to be performed on a plurality of storage systems, each storage system including an associated security appliance having a respective secure encryption processor, wherein the security appliance associated with each storage system of the plurality of storage systems together forming a plurality of security appliances;
means for generating an operation context identifying the management operation on one of the plurality of security appliances in response to initiating the management operation;
means for generating a different random nonce by each security appliance of the plurality of security appliances, the generation of each of the different random nonces together creating a plurality of the different random nonces;
means for assembling the plurality of the different random nonces, a plurality of security appliance identifiers, and the operation context into a message by a first security appliance of the plurality of security appliances, each of the plurality of security appliance identifiers being associated with a respective security appliance;
means for signing the message using a plurality of encryption keys required to authorize performance of the identified management operation;
means for receiving the signed message by a particular security appliance of the plurality of security appliances;
means for examining the signed message by the particular security appliance to determine whether a particular nonce associated with the particular security appliance is present in the signed message in response to receiving the signed message by the particular security appliance, wherein the particular nonce is one of the different random nonce generated by the particular security appliance;
means for performing, by the particular security appliance, the identified management operation in response to determining that the particular nonce is present in the signed message; and
means for disallowing the particular security appliance from performing the identified management operation in response to determining that the particular nonce is not present in the signed message.

6. A non-transitory computer readable medium containing executable program instructions executable by a processor, comprising:
program instructions that initiate a management operation to be performed on a plurality of storage systems, each storage system including an associated security appliance having a respective secure encryption processor, wherein the security appliance associated with each storage system of the plurality of storage systems together forming a plurality of security appliances;
program instructions that generate an operation context identifying the management operation, the operation context generated on one of the plurality of security appliances;
program instructions that generate a different random nonce by each security appliance of the plurality of security appliances, the generation of each of the different random nonces together creating a plurality of the different random nonces;
program instructions that assemble the plurality of the different random nonces, a plurality of security appliance identifiers, and the operation context into a message by a first security appliance of the plurality of security appliances, each of the plurality of security appliance identifiers being associated with a respective security appliance;
program instructions that sign the message using a plurality of encryption keys required to authorize performance of the identified management operation;
program instructions that receive the signed message by a particular security appliance of the plurality of security appliances;
program instructions that examine the signed message by the particular security appliance to determine whether a particular nonce associated with the particular security appliance is present in the signed message, in response to the message being signed by the plurality of encryption keys, wherein the particular nonce is one of the different random nonces generated by the particular security appliance;
program instructions that perform, by the particular security appliance, the identified management operation in response to determining that the particular nonce generated by the particular security appliance is present in the signed message; and
program instructions that disallow the particular security appliance from performing the identified management operation in response to determining that the particular nonce is not present in the signed message.

7. A system for batch signing, comprising:
a plurality of security appliances organized into a cluster, each of the security appliances having a respective secure encryption processor and configured to generate a different random nonce, wherein one of the plurality of security appliances is further configured to generate an operation context identifying a management operation and assemble the plurality of generated random nonces, a plurality of security appliance identifiers, and the operation context into a message, wherein each of the plurality of security appliance identifiers being associated with a respective security appliance;
a plurality of encryption keys required to authorize performance of the identified management operation, wherein each of the encryption keys are used to cryptographically sign the message; and wherein each of the plurality of security appliances is further configured to:
- receive, in response to the message being cryptographically signed by the plurality of encryption keys required to authorize performance of the identified management operation, the cryptographically signed message,
- examine the cryptographically signed message to determine whether a particular nonce associated with the examining security appliance is included in the cryptographically signed message,
- perform, by the examining security appliance, the identified management operation in response to determining that the particular nonce associated with the examining security appliance is included in the signed message, and
- disallow the examining security appliance from performing the identified management operation in response to determining that the particular nonce is not included in the signed message.

8. The system of claim 7 wherein the respective secure encryption processor at each security appliance is configured to generate each of the different random nonces.

9. The system of claim 7 wherein the management operation comprises addition of a new security appliance to the cluster.

10. The system of claim 7 wherein the encryption keys comprise recovery keys.

11. The system of claim 10 wherein each respective secure encryption processor, of the plurality of security appliances, generates each of the different random nonces.

12. The system of claim 7 wherein the plurality of security appliances are further configured to generate the different random nonces in response to initiation of the management operation.

13. The system of claim 7 wherein the message comprises a plurality of messages, each of the plurality of messages including the plurality of the different random nonces and the plurality of security appliance identifiers.

* * * * *

UNITED STATES PATENT AND TRADEMARK OFFICE
CERTIFICATE OF CORRECTION

PATENT NO. : 8,607,046 B1  
APPLICATION NO. : 11/738831  
DATED : December 10, 2013  
INVENTOR(S) : Joshua Oran Silberman et al.

Page 1 of 1

It is certified that error appears in the above-identified patent and that said Letters Patent is hereby corrected as shown below:

In the Specification:
Col. 3, lines 34-35 should read:
~~message contains a series of entries, wherein each entry cornprises an identifier of the entity (e.g., a SEP) generating the~~
message contains a series of entries, wherein each entry comprises an identifier of the entity (e.g., a SEP) generating the Col. 4, line 57 should read:
~~illustratively uses a highquality, software or hardware-based~~
illustratively uses a high quality, software or hardware-based In the Claims:
Claim 5, col. 11, line 60 should read:
~~dom nonce generated by the particular security appli-~~
dom nonces generated by the particular security appli- Claim 8, col. 14, line 2 should read:
~~encryption processor at each security appliance is configured~~
encryption processor of each security appliance is configured Claim 13, col. 14, line 18 should read:
including the plurality of the different random nonces and the Signed and Sealed this
Twenty-fifth Day of February, 2014

Michelle K. Lee
*Deputy Director of the United States Patent and Trademark Office*